(12) United States Patent
Burdick

(10) Patent No.: US 10,377,003 B2
(45) Date of Patent: Aug. 13, 2019

(54) CARPENTRY FEATHERBOARD

(71) Applicant: Brett R. Burdick, Knoxville, TN (US)

(72) Inventor: Brett R. Burdick, Knoxville, TN (US)

( * ) Notice: Subject to any disclaimer, the term of this patent is extended or adjusted under 35 U.S.C. 154(b) by 1232 days.

(21) Appl. No.: 14/484,348

(22) Filed: Sep. 12, 2014

(65) Prior Publication Data

US 2016/0074980 A1    Mar. 17, 2016

(51) Int. Cl.
| | | |
|---|---|---|
| *B23Q 3/00* | (2006.01) | |
| *B27G 21/00* | (2006.01) | |
| *B23D 47/04* | (2006.01) | |
| *B27B 25/10* | (2006.01) | |
| *B27C 5/06* | (2006.01) | |

(52) U.S. Cl.
CPC ............. *B23Q 3/002* (2013.01); *B23D 47/04* (2013.01); *B23D 47/045* (2013.01); *B27B 25/10* (2013.01); *B27C 5/06* (2013.01); *B27G 21/00* (2013.01)

(58) Field of Classification Search
CPC ... Y10T 409/309184; Y10T 409/30924; B27C 5/02; B27C 5/04; B27C 5/06; B25B 11/00; B25B 1/2457; B25B 5/163; B23Q 1/03; B23Q 3/06; B23Q 3/066; B27B 27/00; B27B 27/02; B27B 27/04; B27B 27/06; B27B 27/08; B27B 27/10; B27B 5/16
USPC ................................ 83/446, 477.2; 269/291
See application file for complete search history.

(56) References Cited

U.S. PATENT DOCUMENTS

| | | | | |
|---|---|---|---|---|
| 5,671,915 A | * | 9/1997 | Williams | ................ B25B 5/006 |
| | | | | 269/231 |
| 6,619,347 B2 | | 9/2003 | Jukoff et al. | |
| 2008/0277024 A1 | * | 11/2008 | Kozina | .................. B23D 47/04 |
| | | | | 144/253.6 |

FOREIGN PATENT DOCUMENTS

WO    2008131274 A2    10/2008

* cited by examiner

*Primary Examiner* — Shelley M Self
(74) *Attorney, Agent, or Firm* — Luedeka Neely Group, PC

(57) ABSTRACT

A carpentry featherboard having a curved contact surface generally configured in the shape of a spiral and having a pivot point of the body and a plurality of radii defined between the pivot point and portions of the contact surface, the radii progressively increasing in dimension to define the spiral shape of the featherboard body.

5 Claims, 6 Drawing Sheets

CARPENTRY FEATHERBOARD

FIELD

This present disclosure relates to safety devices for use with power tools. More particularly, the disclosure relates to featherboard devices for use with routers, saws, and the like for securing a workpiece against a guide fence and for holding down a workpiece.

BACKGROUND

A featherboard is a woodworking accessory that is used when working with stationary routers or power saws such as table saws or handsaws. A featherboard may be used to help provide an accurate cut by maintaining a workpiece against a straight edge or fence of a saw.

Featherboards also serve to avoid kickback of a workpiece. Featherboards are also used to hold a workpiece down against the work surface by mounting them to the vertical surface of the fence.

The present disclosure relates to an improved featherboard configurations.

SUMMARY

The disclosure advantageously provides a carpentry featherboard structure of improved construction.

In one aspect, the featherboard is releasably positionable adjacent a power tool surface for guiding a workpiece. The featherboard includes a featherboard body having a curved contact surface generally configured in the shape of a spiral and having a pivot point of the body and a plurality of radii defined between the pivot point and portions of the contact surface. The radii progressively increase in dimension to define the spiral shape of the featherboard body. A clamp releasably maintains the featherboard at a desired angular position and permits adjustment of the angular position of the featherboard and selection of a site of the contact surface for contact with the workpiece.

BRIEF DESCRIPTION OF THE DRAWINGS

Further advantages of the disclosure are apparent by reference to the detailed description in conjunction with the FIGS., wherein elements are not to scale so as to more clearly show the details, wherein like reference numbers indicate like elements throughout the several views, and wherein.

DETAILED DESCRIPTION

Figure 1:
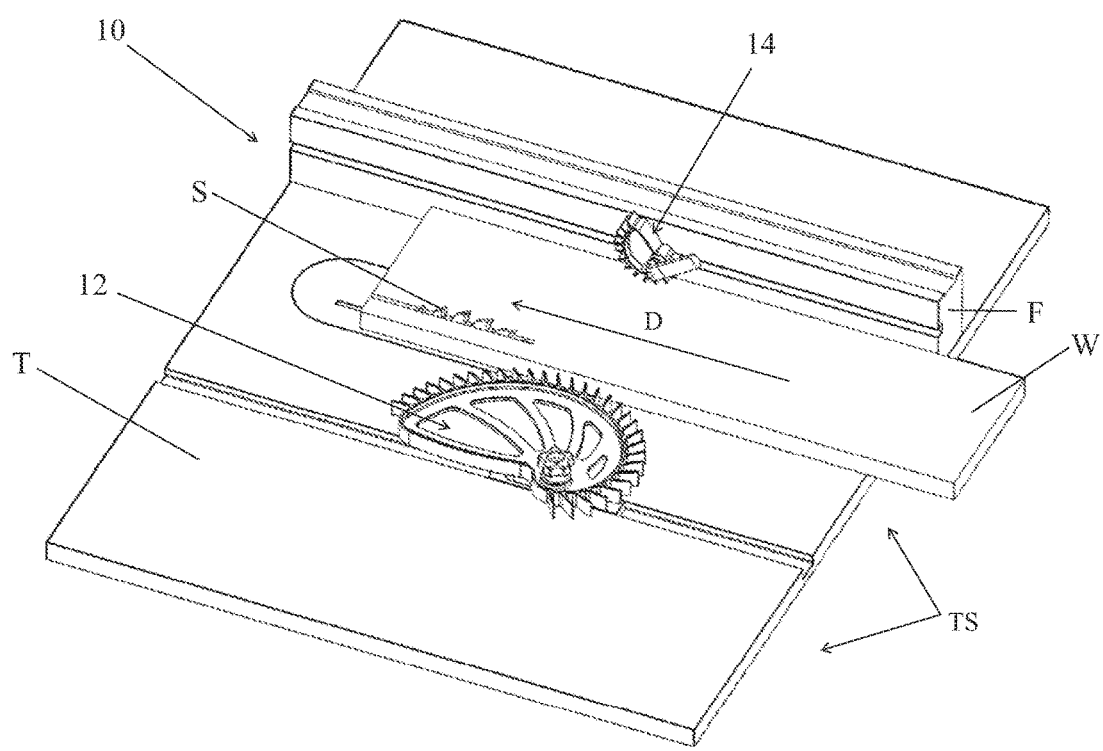
FIG. 1 shows a carpentry featherboard system according to the disclosure mounted onto a table saw.
Figure 2:
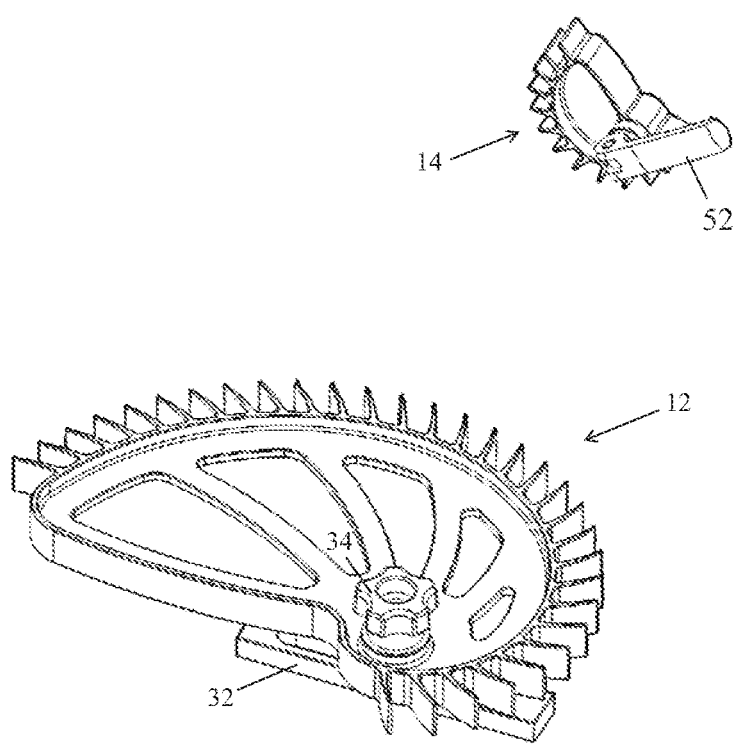
FIG. 2 shows featherboards of the system of FIG. 1, namely a lateral featherboard and a vertical featherboard.
Figure 3:
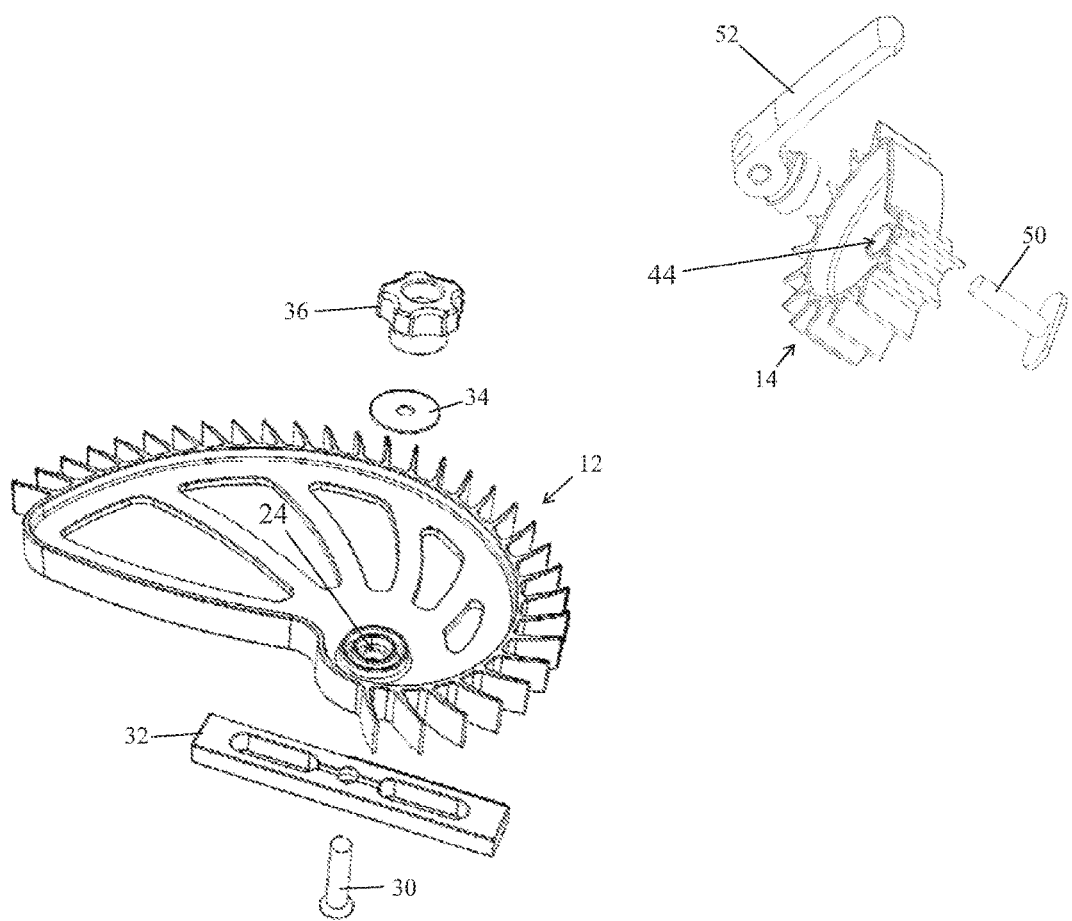
FIG. 3 is an exploded view of FIG. 2.
Figure 4:
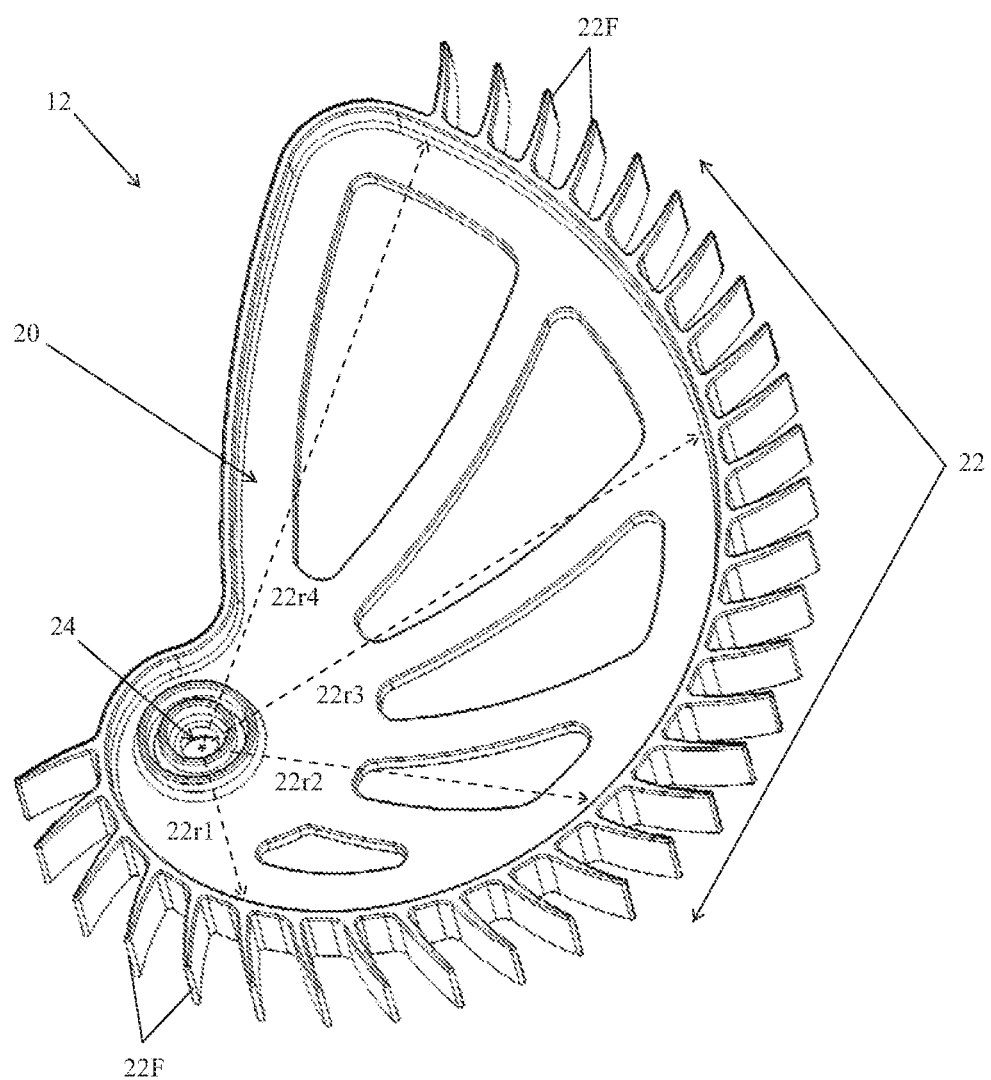
FIG. 4 is perspective view of a lateral featherboard of the system of FIG. 1.
Figure 5:
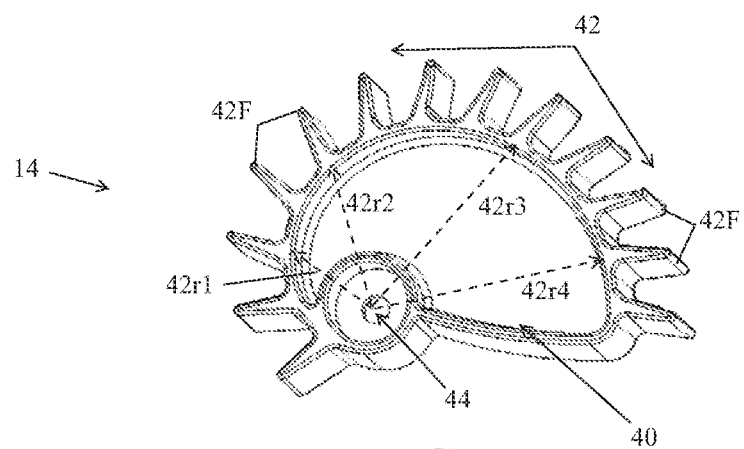
FIG. 5 is perspective view of a vertical featherboard of the system of FIG. 1.

With reference to the drawings, the disclosure relates to a featherboard system 10 having a lateral featherboard 12 and a vertical featherboard 14. The lateral featherboard 12 is mounted onto a table T of a table saw TS. The vertical featherboard 14 is mounted onto a fence F of the table saw TS. The lateral featherboard 12 helps to provide an accurate cut by saw blade S by maintaining workpiece W, such as a wood board, against the fence F as the workpiece moves in a direction indicated by Arrow D.

The vertical featherboard 14 helps maintain the workpiece W vertically restrained down against the table T. It will be understood that the featherboards described herein can also be used with other power cutters, such routers and handsaws. Also, it will be understood that while the system 10 preferably includes both the lateral featherboard 12 and the vertical featherboard 14, each of the featherboards 12 and 14 may be used without the other.

The lateral featherboard 12 includes a featherboard body 20 having a curved contact surface 22 generally configured in the shape of a spiral, preferably a logarithmic spiral or an equiangular spiral. The body 20 is characterized in that the distance from a pivot point aperture 24 of the body 20 to the contact surface 22 define a plurality of radii $22r1$, $22r2$, $22r3$, $22r4$ of progressively increasing distance from $22r1$ to $22r4$. This configuration advantageously allows for simple and quick changes of the extension distance provided by the featherboard 12 to make contact with the workpiece W.

Figure 6:
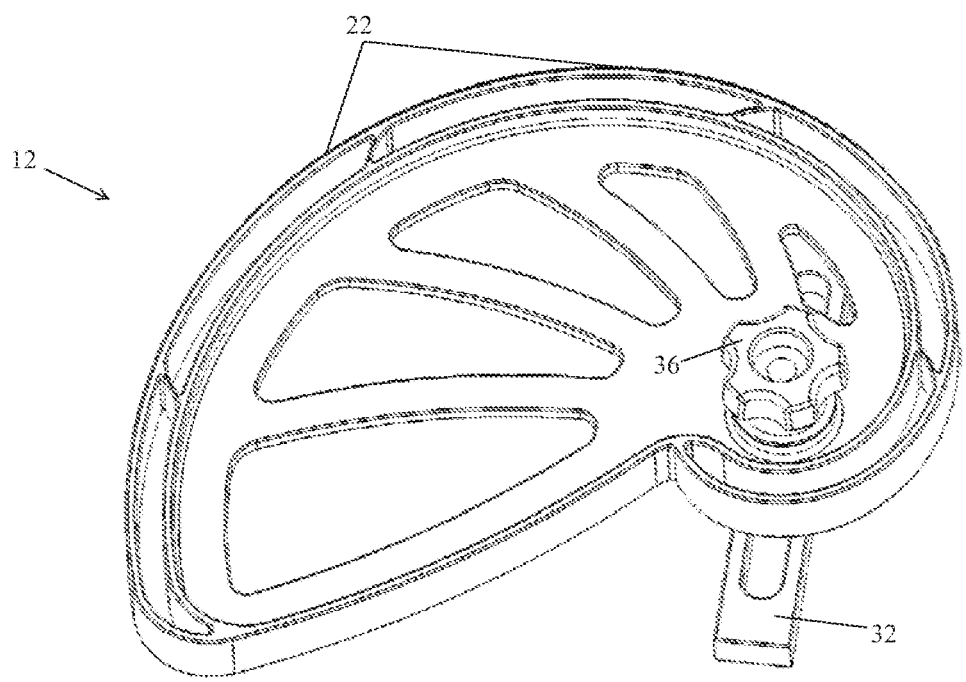
FIG. 6 shows an alternate embodiment of a lateral featherboard according to the disclosure.
Figure 7:
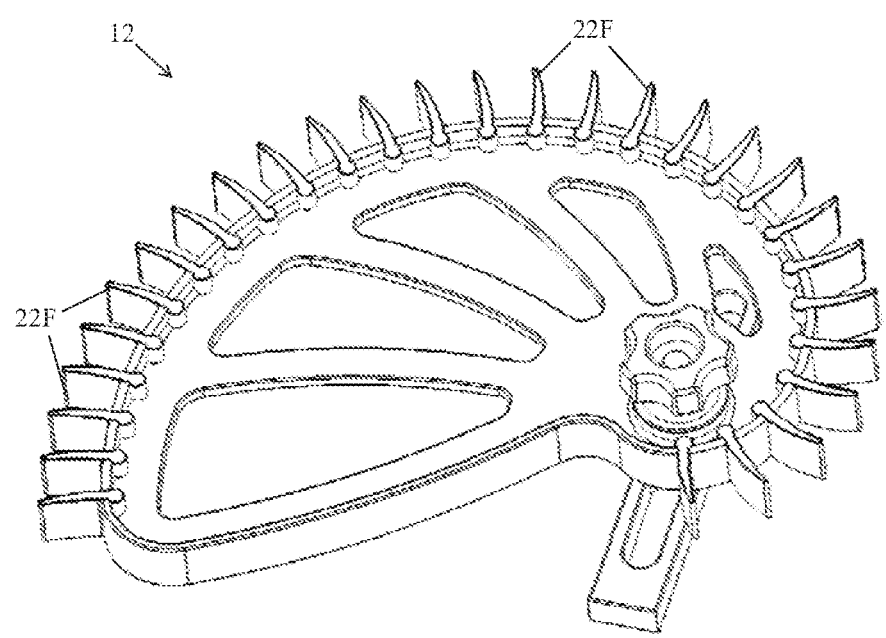
FIG. 7 shows still a further embodiment of a lateral featherboard according to the disclosure.

The contact surface 22 can be relatively smooth and rigid (FIG. 6) or have a smooth and flexible element. For example, as shown, the contact surface 22 may include a plurality of flexible fingers 22F. The fingers 22F flex against the edge of the workpiece W. The protrusions are desirably angled in the direction of the workpiece travel so that in the workpiece is only allowed to travel in the forward direction against the force of the saw blade or router bit, or the like. The fingers 22F may be overmolded as a layer onto the contact surface 22, such as shown in FIG. 6. Alternatively, the fingers 22F may be individually inset into corresponding recesses of the contact surface 22, such as shown in FIG. 7.

The lateral featherboard 12 is releasably retained by a clamping structure, such as provided by a threaded fastener 30, miter slot clamp 32, washer 34, and knob 36 threaded onto the fastener 30. The fastener 30 extends through the pivot point aperture 24 and release of the clamping structure permits adjustment of the angular position of the featherboard 12 and selection of the site of the contact surface 22 for contact with the workpiece W based on the dimension of the workpiece W. It will be appreciated that other mechanical or magnetic clamping structures may be utilized to adjustably retain the featherboard 12.

The vertical featherboard 14 is of similar configuration as the lateral featherboard 12, but is of smaller dimension. The vertical featherboard 14 includes a featherboard body 40 having a curved contact surface 42 preferably configured in the shape of a logarithmic spiral or equiangular spiral. The body 40 is characterized in that the distance from a pivot point aperture 44 of the body 40 to the contact surface 42 define a plurality of radii $42r1$, $42r2$, $42r3$, $42r4$ of progressively increasing distance from $42r1$ to $42r4$. This configuration advantageously allows for simple and quick changes of the extension distance provided by the featherboard 14 to make contact with the workpiece W.

The contact surface 42 can be relatively smooth and rigid or have a smooth and flexible element. If desired, the contact surface 42 may include a plurality of flexible protrusion or fingers 42F, similar to the fingers 22F.

The featherboard 14 is releasably retained by a clamping structure, such as a fastener 50 and a cooperating quick-release clamp 52. The fastener 50 extends through the pivot point aperture 44 and release of the clamping structure permits adjustment of the angular position of the featherboard 14 and selection of the site of the contact surface 42 for contact with the workpiece W based on the dimension of the workpiece W. It will be appreciated that other mechanical or magnetic clamping structures may be utilized to adjustably retain the featherboard 14.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A carpentry featherboard releasably positionable adjacent a power tool surface for guiding motion of a workpiece being moved in a direction relative to the power tool surface, the featherboard comprising: a featherboard body having a curved contact surface generally configured in the shape of a spiral and having a pivot point of the body and a plurality of radii defined between the pivot point and portions of the contact surface, the radii progressively increasing in dimension to define the spiral shape of the featherboard body, wherein a clamp located at the pivot point releasably maintains the featherboard at a desired angular position and permits adjustment of the angular position of the featherboard and selection of a site of the contact surface for contact with the workpiece to guide motion of the workpiece as the workpiece is moved in a direction relative to the power tool surface.

2. The carpentry featherboard of claim 1, wherein the featherboard is a lateral featherboard.

3. The carpentry featherboard of claim 1, wherein the featherboard is a vertical featherboard.

4. The carpentry featherboard of claim 1, wherein the contact surface of the featherboard includes a plurality of flexible fingers.

5. The carpentry featherboard of claim 1, wherein the spiral is configured in the shape of a logarithmic spiral or an equiangular spiral.

\* \* \* \* \*